United States Patent [19]

Matsumura et al.

[11] Patent Number: 5,776,421
[45] Date of Patent: Jul. 7, 1998

[54] REFORMING REACTOR

[75] Inventors: Mitsuie Matsumura; Toshio Shinoki, both of Tokyo, Japan

[73] Assignee: Mitsubishi Denki Kabushiki Kaisha, Tokyo, Japan

[21] Appl. No.: 619,838

[22] Filed: Mar. 19, 1996

[30] Foreign Application Priority Data

Jul. 19, 1995 [JP] Japan ................................ 7-182919

[51] Int. Cl.⁶ .................................. B01J 8/04; H01M 8/18
[52] U.S. Cl. .......................... 422/197; 429/16; 429/20
[58] Field of Search ............................. 422/197, 196, 422/198; 429/34, 19, 16, 20, 26

[56] References Cited

U.S. PATENT DOCUMENTS

| | | | |
|---|---|---|---|
| 4,618,543 | 10/1986 | Matsumura et al. | 429/34 |
| 4,647,516 | 3/1987 | Matsumura et al. | 429/19 |
| 4,714,593 | 12/1987 | Naito et al. | 422/197 |
| 5,100,743 | 3/1992 | Narita et al. | 429/19 |
| 5,609,834 | 3/1997 | Hamada et al. | 422/197 |

FOREIGN PATENT DOCUMENTS

| | | |
|---|---|---|
| 4114901 | 4/1992 | Japan. |
| 5174858 | 7/1993 | Japan. |
| 676839 | 3/1994 | Japan. |

*Primary Examiner*—Ivars Cintins
*Attorney, Agent, or Firm*—Sughrue, Mion, Zinn, Macpeak & Seas, PLLC

[57] ABSTRACT

A reforming reactor includes a reforming chamber for reforming a reaction gas containing hydrocarbon or alcohol to a combustion gas containing hydrogen by a reforming reaction, a plurality of gas flow passages disposed in the reforming chamber for guiding the reaction gas from an inlet side toward an outlet side thereof, and reforming blocks provided in a plurality of predetermined sections of each of the gas flow passages and containing reforming catalysts with which the reaction gas flowing through the gas flow passages is brought into contact.

16 Claims, 11 Drawing Sheets

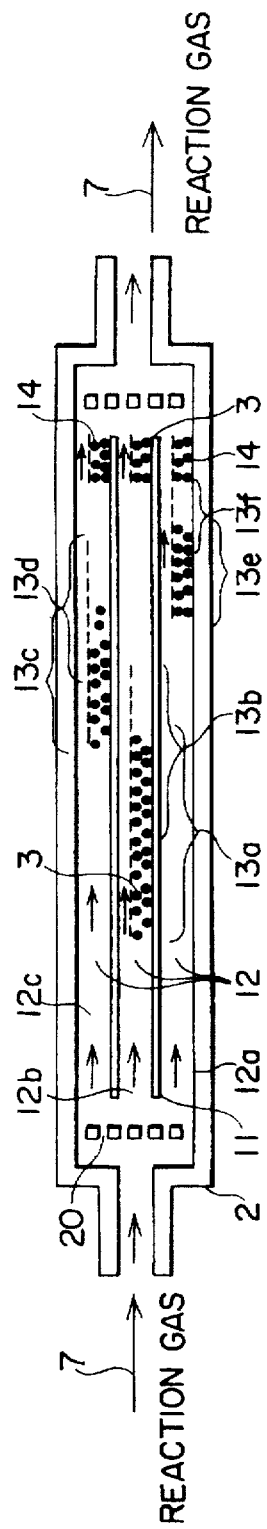
FIG. I(a)
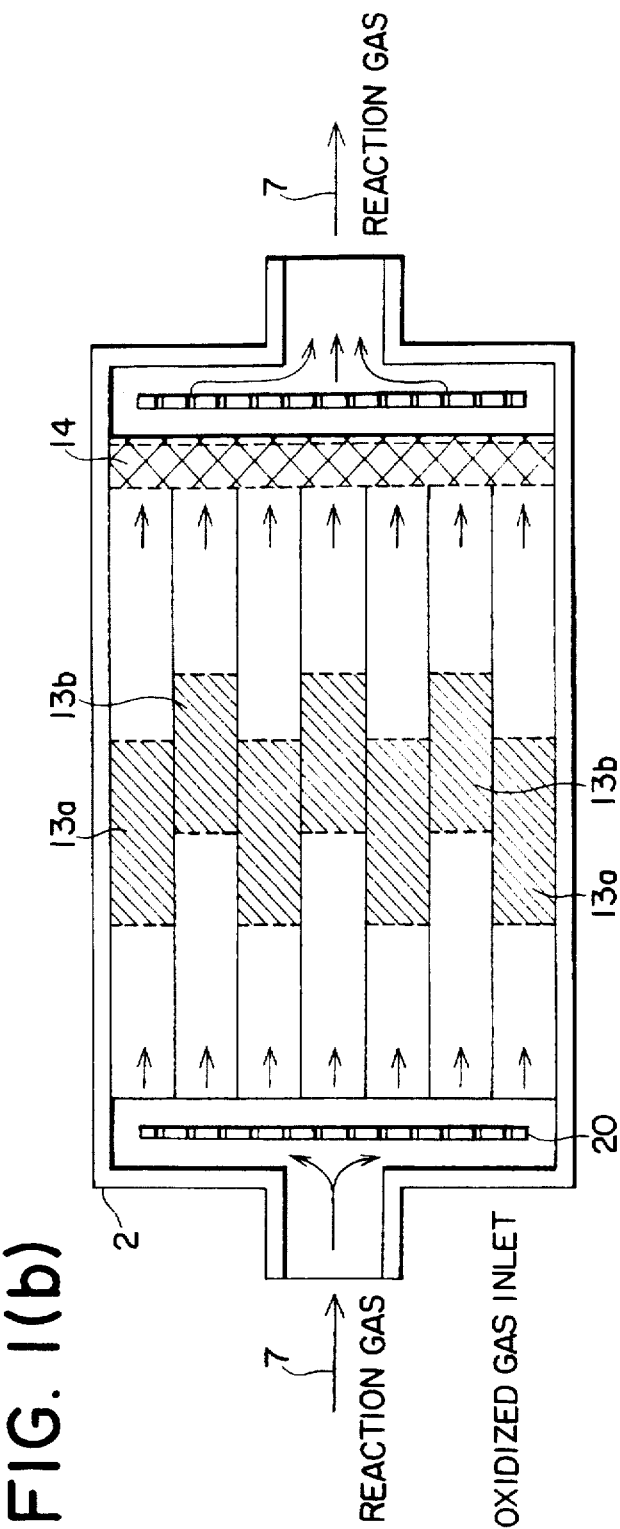
FIG. I(b)

REACTION GAS

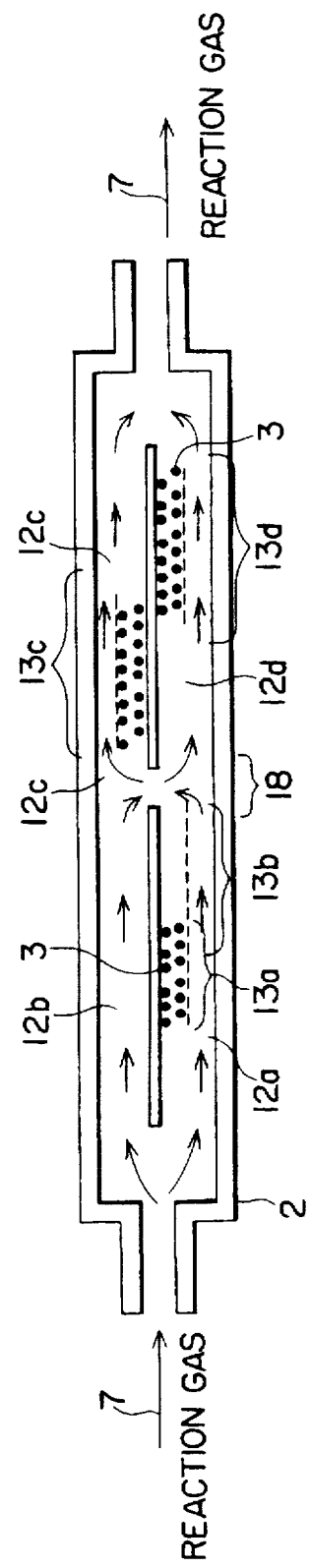

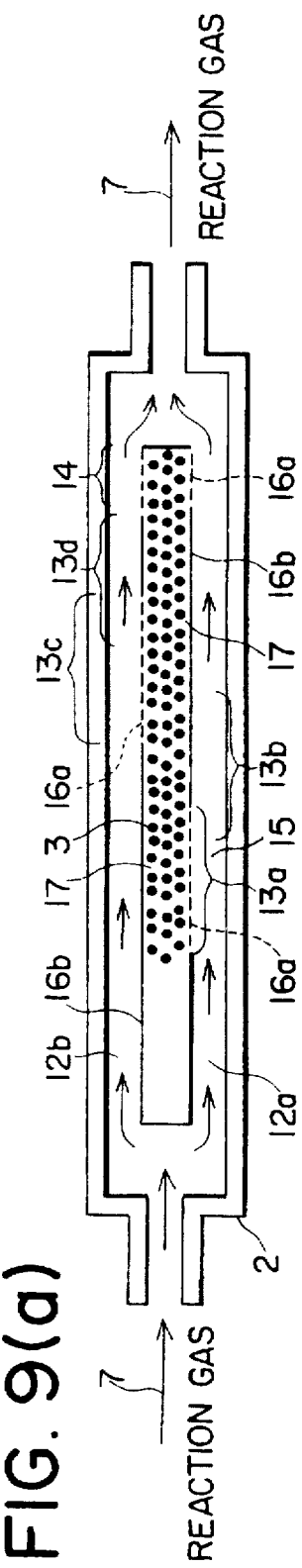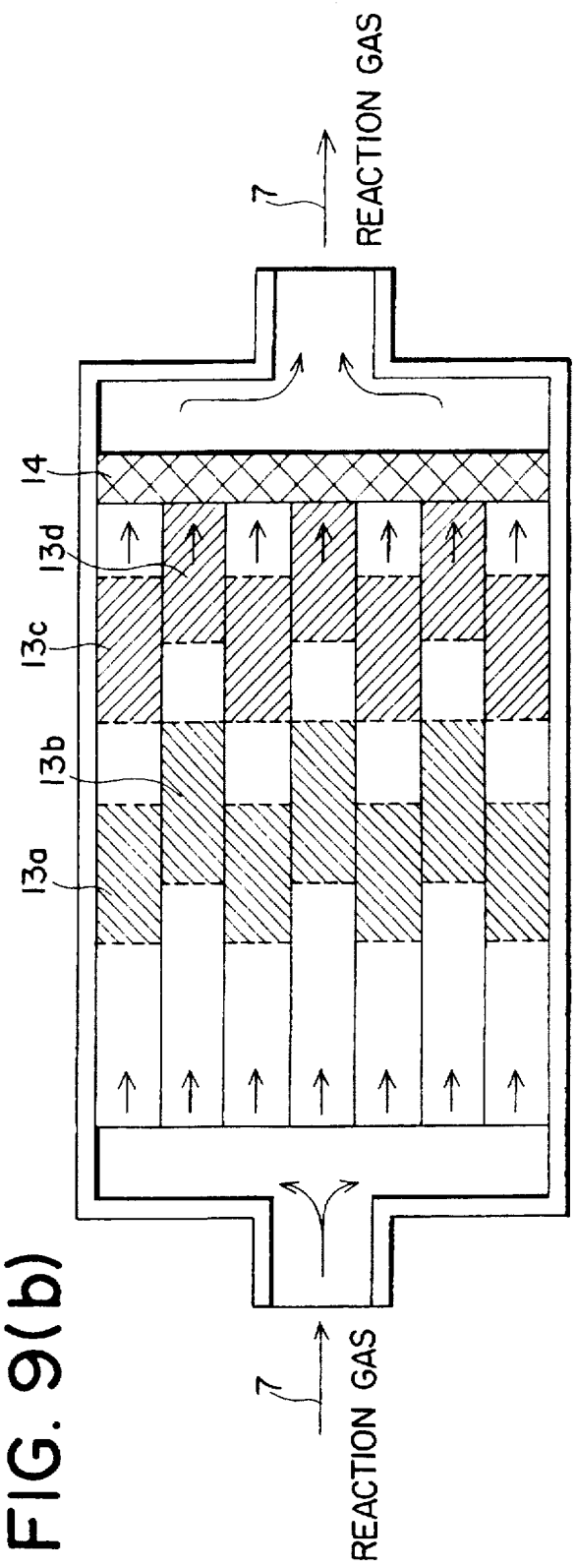
FIG. 9(a)
FIG. 9(b)

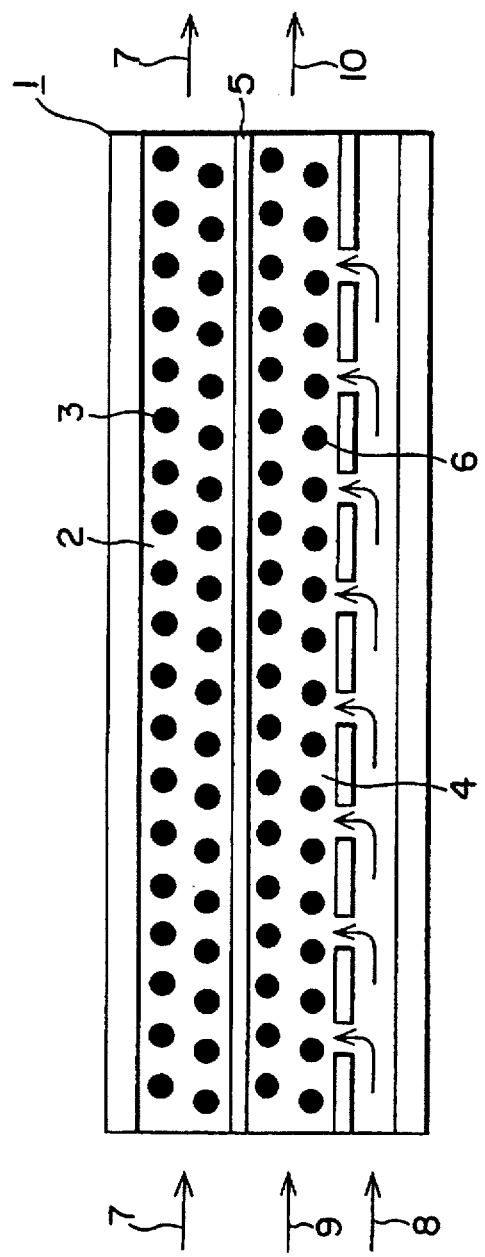

REFORMING REACTOR

BACKGROUND OF THE INVENTION

1. Field of the Invention

The present invention relates to a reforming reactor, and more particularly to the structure of the reforming reaction section of the reforming reactor.

2. Description of Related Art

FIG. 10 is a sectional view showing an example of a conventional plate-shaped reforming reactor described, for example, in "*ISHIKAWAJIMA-HARIMA TECHNICAL PUBLICATION* (Vol. 31, No. 6, November, 1991)." This reforming reactor 1 includes a reforming chamber 2 for advancing a reforming reaction and a heating chamber 4 provided adjacent to the reforming chamber 2. The reforming chamber 2 forms a reaction gas flow passage through which reaction gas passes, and a reforming catalyst 3 is held in the interior of the reforming chamber 2. The reforming chamber 2 and the heating chamber 4 are partitioned by a partition wall 5. In the interior of the heating chamber 4 there is held a catalytic combustion catalyst 6.

The reforming reactor 1 is constructed such that it supplies fuel gas and air to the heating chamber 4, in turn this fuel gas burns by the chemical reaction with the aid of the catalytic combustion catalyst 6, and heats the reforming chamber 2.

In FIG. 10, an arrow 7 indicates the flow of the reaction gas which is supplied to the reforming chamber 2 and which is mainly composed of hydrocarbon or an alcohol and steam that are exhausted. An arrow 8 indicates the flow of the fuel gas for heating which is supplied to the heating chamber 4, an arrow 9 indicates the flow of air which is supplied to the heating chamber 4, and an arrow 10 indicates the flow of exhaust gas which is exhausted from the heating chamber 4.

Now, the operation will be described. If reaction gas 7 containing raw material, such as hydrocarbon or an alcohol, and steam is externally supplied to the reforming chamber 2 of the reforming reactor 1, then hydrocarbon or alcohol will react in the reforming chamber 2 with steam by a reforming reaction with the aid of the reforming catalyst 3 and be converted into hydrogen, carbon monoxide and carbon dioxide gas. In the case of hydrocarbon being methane, this reaction is expressed by Equation (1).

$$CH_4 + H_2O \rightarrow CO + 3H_2 \quad \quad (1)$$

When this occurs, the reforming reaction which occurs on the reforming catalyst 3 is an endothermic reaction. The reaction heat needed to keep up the endothermic reaction is supplied from the heating chamber 4 side of the reforming reactor 1 through the partition wall 5. To the heating chamber 4 there is supplied fuel gas 8 and air 9, and the fuel gas 8 is burnt by the chemical reaction with the aid of the catalytic combustion catalyst 6 held in the heating chamber 4. The generated combustion heat is supplied from the heating chamber 4 to the reforming chamber 2 as heat of the reforming reaction.

Thus, generally the reforming reactor 1 is provided with the reforming chamber 2 which has the reforming catalyst 3 and where a reforming reaction is advanced, and the heating chamber 4 which supplies reaction heat to the reforming chamber 2. The conventional plate-shaped reforming reactor 1, shown in FIG. 10, has the heating chamber 4 provided adjacent to the reforming chamber 2 for performing the combustion of the fuel gas 8, but in addition to this conventional technology shown, there is generally known a reforming reactor where a heating medium, for example, high-temperature gas is externally introduced into a heating chamber and where the heat of the high-temperature gas is supplied to a reforming chamber as reaction heat. Furthermore, as another conventional technology, there is also known a reforming reactor where only a reforming chamber is assembled into some other reaction apparatus having a heat generation action and where an excess of heat generated in this reaction apparatus is given to the reforming chamber and utilized as heat of the reforming reaction.

For example, in the fuel cell apparatus shown in Japanese Patent Laid-Open No. 61-24168, a reforming reactor comprising only a plate-shaped reforming chamber is inserted into a fuel cell stacked body, and an excess of reaction heat generated in the fuel cell stacked body is supplied to the reforming chamber as heat of the reforming reaction.

A plate-shaped reforming reactor such as that shown in FIG. 10 is obtainable, for example, by bending and welding a plate-shaped thin metal plate to form the housing of the reforming reactor and suitably putting a reforming catalyst, a catalytic combustion catalyst, and a heat transfer promoting substance into the reforming and heating chambers formed in the housing. As occasion demands, the plate-shaped structure shown in FIG. 10 is made as a unit and a plurality of the same units are stacked to obtain a large capacity reforming reactor.

In the design of a plate-shaped heat exchange type reforming reactor such as this, in order to maintain the temperature distribution of the reaction surface as small as possible and for the reforming reactor to be operated stably for a long period of time, it is extremely important to design the reforming reactor so that at each of the reaction portions a heat balance is achieved between the endothermic heat obtained by the reforming reaction in the reforming chamber 2 and the heat generated by the heating chamber 4.

The reaction rate in the reforming reactor, when for example methane is used for fuel, depends upon the partial pressure of methane and the activity and quantity of the reforming catalyst. Generally, the greater the partial pressure of methane as well as the activity and quantity of the reforming catalyst, the reaction velocity will become greater. In a typical example, the reforming reaction rate of methane is proportional to the product of the partial pressure of methane, the activity of a reforming catalyst, and the quantity of the reforming catalyst, as shown in Equation (2) below.

Reforming reaction rate of methane=k×partial pressure of methane×catalytic activity×quantity of catalyst (2)

where k is a proportional constant.

In the conventional reforming reactor 1, the granular reforming catalysts 3 are equally distributed in the reforming chamber 2 of the reforming reactor 1. At this time, the partial pressure of hydrocarbon, for example, methane contained in the reaction gas is greater at the inlet portion of the reaction gas in the reforming chamber 2 than at the outlet portion of the reaction gas. Therefore, the reforming reaction rate becomes greater at the inlet portion of the reforming chamber 2, as shown in Equation (2). The rapid progress of the reforming reaction causes a concentrated endothermic load, and causes a local temperature drop in that portion. Conversely, at the outlet portion of the reforming reactor, the endothermic quantity by the reforming reaction becomes less and the heat generated by combustion becomes excessive. More specifically, in the conventional example shown in FIG. 10, the heat balance between the endothermic quantity by the reforming reaction and the heat quantity given from the heating chamber tends to be lost particularly at the inlet and outlet portions of the reforming chamber 2. For this reason, the temperature of the inlet portion of the reforming chamber 2 becomes low, dropping to about 400 C. (this inlet portion forms a low- temperature portion), while the outlet portion of the reforming chamber 2 exceeds 700 C. and the heating chamber 4 becomes about 900 C. (this portion forms a high-temperature portion), and consequently, a large temperature distribution or variation occurs in the flow direction of the reaction gas 7.

If a large temperature distribution such as this occurs in the reforming chamber 2, then thermal stresses based on a differential thermal expansion will develop in the reforming chamber to generate cracks in the metal material or welded portions as well as strains in the reforming reactor due to thermal stresses or thermal fatigue. Particularly, in the reforming reactor of the plate-shaped heat exchange type obtained by bending and welding a thin metal plate, the thickness of the raw material is usually thin and the welded portions are also weak in mechanical strength, and consequently, there is a problem from a structural strength point of view in order to perform a long-term operation while allowing a large temperature distribution or a repeated thermal cycle.

In addition, for the reforming catalyst or catalystic combustion catalyst filled in the reforming reactor, there are the following problems. That is, particularly, in the case of the reforming catalyst where magnesia is used as a carrier, there is the danger that the catalytic activity of the catalyst is reduced at the low-temperature portion by the hydrolysis of magnesia. For the catalytic combustion catalyst, a reduction in the catalytic activity by sintering becomes large in the operating temperature range exceeding, for example, 800 C., and consequently, there is the problem that a stable operation cannot be performed over a long period of time.

Utilizing general technology of chemical reaction engineering, it is possible to overcome the aforementioned problems by controlling the reforming reaction rate in the flow direction of the reaction gas and suppressing the reforming reaction rate at the inlet portion of the reforming chamber. More specifically, a more uniform preferable distribution of a reforming reaction is obtainable by suitably controlling the distribution of the filling quantity of the reforming catalyst 3 in the flow direction of the reaction gas or varying the catalytic activity of the reforming catalyst 3 in the flow direction of the reaction gas. However, in order to obtain the aforementioned preferable distribution, it is necessary to vary the activity or filling quantity of the reforming catalyst in the flow direction of the reaction gas to more than ten times. For this reason, a variety of catalysts becomes necessary and the catalyst filling method and structure also become complicated, so a problem arises from the standpoint of manufacturing cost.

For example, when the filling quantity of the catalyst is controlled to optimize the distribution of the reforming reaction, the catalyst filling quantity needs to be reduced, in particular, at the inlet portion of the reaction gas to ¹/₁₀ or so of a normal uniform average catalyst filling quantity. However, the reforming catalyst positioned at the inlet portion of the reaction gas is generally liable to become unstable because of the influence of poisoning by impurities such as sulfur contained in the reaction gas or because of the activity reduction due to the oxidation by a large quantity of steam.

FIG. 11 shows as an example the distribution of catalyst activity in the catalyst bed after operation of 5000 to 9000 hours. As shown in FIG. 11, the reforming catalyst positioned at the inlet portion of the reforming reactor tends to lose catalyst activity more than the catalysts held in the other portions does. Therefore, amendment based on the conventional general reaction engineering technology, in which the catalyst filling quantity is considerably reduced at the inlet portion of the reforming reactor to suppress the progress of the reforming reaction, is noticeably subjected to an adverse influence of the activity reduction of the reforming catalyst. That is, even if a predetermined distribution of the reforming rate were obtained at the initial stage of operation, the catalyst activity after a long period of operation would be lost at the inlet portion where the reforming reaction would not be advanced, so a desirable predetermined distribution of the reforming rate, i.e., a predetermined uniform temperature distribution, would not be obtained.

Furthermore, in such a method, if the activity of the reforming catalyst 3 is constantly independent of the passage of time and there is no adverse influence such as the poisoning by sulfur contained in the reaction gas, then the reforming catalyst will function satisfactorily and a desired reforming rate distribution, i.e., a desired temperature distribution will be obtained as designed. However, in practice the activity of the reforming catalyst does not remain constant but varies with time.

FIG. 12 is a diagram showing an example of the change with the passage of time of the activity of the reforming catalyst. The reforming catalyst is usually formed of fine active metal, which is carried on a ceramic carrier with a porous structure. Some activity reduction based on sintering of the fine active metal, cannot be avoided for a long period of time. This conventional technology is so designed that the reforming reaction rate itself on the reforming catalyst is controlled to adjust a reforming reaction rate as well as the resultant reforming rate distribution to a predetermined distribution. Therefore, if the activity of the reforming catalyst changes, then the reaction rate of each portion of the reforming reactor will vary in proportion to the change, and the reforming rate distribution of the reforming reactor will changes. That is, the conventional technology has the fundamental problem on principles that the setting of the reforming rate distribution is largely dependent upon catalyst activity itself and that it is difficult to obtain a fixed stable distribution of a reforming reaction rate, i.e., a stable temperature distribution over a long period of time.

Because the conventional reforming reactor is constructed as described above, the progress of the reforming reaction easily becomes large at the inlet portion through which the reaction gas is introduced, and the reactor becomes structurally complicated and expensive in order to avoid such an excessive progress of the reforming reaction. In addition, even if a predetermined reforming rate distribution, i.e., a predetermined temperature distribution were set, the conventional reactor has the problem that it is difficult to obtain a stable reforming rate distribution, i.e., a stable temperature distribution over a long period of time because of the aforementioned activity reduction.

BRIEF SUMMARY OF THE INVENTION

The present invention has been made in order to solve problems such as described above, and accordingly, an object of the invention is to obtain a reforming reactor which is structurally simple and in which a distribution of a reaction rate of a reforming reaction hardly varies with respect to a variation in the activity of a reforming catalyst and as a result a predetermined reaction rate distribution, i.e., temperature distribution can be obtained over a long period of time, and also in which reactor design is easy and inexpensive.

According to one aspect of the invention, there is provided a reforming reactor comprising: a reforming chamber for reforming a reaction gas into a reformed gas by a reforming reaction; a plurality of gas flow passages disposed in said reforming chamber for guiding said reaction gas from an inlet side toward an outlet side thereof; and reforming blocks provided in a plurality of predetermined sections of each of said gas flow passages and containing reforming catalysts with which said reaction gas, flowing through said gas flow passages, is brought into contact.

According to the above structure, the reforming block has a reforming catalyst enough for a reforming reaction to nearly reach its equilibrium state. The reaction rate of reforming reaction in the reforming block is determined by the flow rate, composition, temperature, and pressure conditions of the reaction gas supplied to the reforming block, and becomes nearly independent of the activity of the catalyst itself. The entire distribution of the reforming reaction rate in the reforming chamber of the reforming reactor is obtained by setting the quantities of reforming reaction at each of a plurality of reforming blocks of the reforming chamber and the arrangement of the reforming blocks. That is, a detailed design of the reactor based on reaction kinetics, including the activity-loss of the reforming catalyst, is not required in designing a distribution of a reforming reaction rate. Basically, the distribution of reforming reaction rate can be accurately and simply designed based on the flow rate of the reaction gas supplied to each reforming block, the equilibrium reforming coefficient, and the arrangement of the reforming blocks. In addition, the distribution of reforming reaction rate, set in this way, is insensitive to a change in the activity of the reforming catalyst, and consequently, a stable reaction rate distribution, i.e., a stable temperature distribution is obtained over a long period of time.

In a preferred form of the invention, said plurality of reforming blocks are distributed in correspondence with a distribution of heat input to said reforming chamber.

According to a structure such as this, the arrangement of the reforming blocks is made in correspondence with the distribution of heat input to the reforming chamber, and the reforming reaction in each reforming block proceeds according to a supply of reaction heat to the reforming chamber. Accordingly, a reforming reactor with a uniform temperature distribution can be obtained.

In another preferred form of the invention, reforming reaction rate at each of said plurality of reforming blocks is determined by controlling a flow rate of reaction gas to each reforming block.

According to a structure such as this, the adjustment of the flow rate of the reaction gas that is supplied to the reforming block is performed by adjusting the flow resistance of the gas flow passage which guides the reaction gas to flow through the reforming block. Accordingly, the adjustment of flow rate can be accurately performed independently of the catalyst filling structure in the reforming block.

In still another preferred form of the invention, a final reforming block is provided at a downstream side of each of said reforming blocks for completion of reforming said reaction gas with the aid of said reforming catalysts.

According to a structure such as this, even in a case where the progress of the reforming reaction in the reforming block is partially insufficient or the reaction gas skips some of the reforming blocks, the reforming reaction can reliably reach its equilibrium state by the action of the final reforming block.

In a further preferred form of the invention, said final reforming block is disposed in a portion of said reforming chamber which operates at a high temperature.

According to a structure such as this, the final reforming block operates at a high temperature which is advantageous for reforming reaction from equilibrium point of view, and a higher conversion of reforming reaction is obtainable.

In a further preferred form of the invention, said reforming reactor is comprising only a plate-shaped reforming chamber and is inserted into a fuel cell stacked body.

According to a structure such as this, the reforming block holds the reforming catalyst directly in the gas flow passage. Accordingly, an extra space for holding the reforming catalyst is unnecessary, the contact between the reaction gas and the catalyst can be sufficiently assured, and a sufficient reaction is obtainable with a compact shape.

In a further preferred form of the invention, said fuel cell is a molten carbonate type fuel cell.

According to a structure such as this, the final reforming block holds the reforming catalyst directly in the gas flow passage. Accordingly, an extra space for holding the reforming catalyst is unnecessary, the contact between the reaction gas and the catalyst can be sufficiently assured, and a sufficient reaction is obtainable with a compact shape.

In a further preferred form of the invention, said reforming blocks are constructed by holding said reforming catalyst in said gas flow passages to thereby form a partition plate in said gas flow passage so that said gas flow passage is partitioned into a first area in which said reforming catalyst is disposed, and a second area through which said reaction gas flows.

According to a structure such as this, the reforming catalyst in each reforming block is held directly on one side of the gas flow passage. Accordingly, the reaction gas can flow through the uniform cross section of the gas flow passage, the pressure drop can be reduced, and a distribution ratio of gas to each reforming block can be accurately and easily set. Furthermore, the gas flow passage structure and the catalyst filling structure can be separately designed and manufactured, and a reforming reactor which is easy to be designed and manufactured is obtainable.

In a further preferred form of the invention, said final reforming block is constructed by holding said reforming catalyst in said gas flow passage in such a way that said reforming catalyst occupies part of the cross section of each said gas flow passages.

According to a structure such as this, the reaction gas can flow through the uniform cross section of the gas flow passage, the pressure drop can be reduced, and a distribution ratio of gas to each reforming block can be accurately and easily set.

In a further preferred form of the invention, said partition plate has at least a permeable portion for allowing permeation of said reaction gas between adjacent ones of said gas flow passages.

According to a structure such as this, the contact between the reaction gas and the reforming catalyst becomes easy, and the afore-mentioned advantages can be further enhanced.

In a further preferred form of the invention, said gas flow passages are formed by a corrugated plate having opposite surfaces and a pair of impermeable plates attached to the opposite surfaces of said corrugated plate.

According to a structure such as this, a plurality of gas flow passages which are materially separated from one another can be set only by constituting both surface of the corrugated plate by means of impermeable plates. Accordingly, there is obtainable a reforming reactor which is structurally simple and is inexpensive.

In a further preferred form of the invention, said gas flow passages are laminated in layers by separation plate means.

In a further preferred form of the invention, each of said layers is partitioned into a reforming catalyst layer and a gas flow passage layer by partition plate means having a permeable portion.

In a further preferred form of the invention, each of said layers has gas flow passages which are obtained by dividing a gas flow space on each layer in the right direction to the direction of lamination.

In a further preferred form of the invention, positions of said reforming blocks in adjacent ones of said divided gas flow passages are shifted from each other in a flow direction of said reaction gas.

According to a structure such as this, in the reforming chamber of the reforming reactor comprising a multilayer structure, a plurality of gas flow passages separated from one another can be easily realized with a simple structure. In addition, the degree of freedom of the disposition of the reforming blocks is large and an ideal distribution of reforming reaction rate can be easily achieved.

Furthermore, a plurality of spaces which hold reforming catalysts constituting a plurality of reforming blocks, which were lead from a plurality of mutually separated gas flow passages contained in the same gas flow passage layer, can be collected as a single reforming catalyst layer. As a result, a catalyst filling operation becomes easier. Moreover, the setting of the disposition of the reforming blocks can be performed, for example, by providing a partition plate between the gas flow passage layer and the reforming catalyst layer and setting a permeable area of this partition plate, and consequently, an ideal setting of the reforming blocks can be easily achieved.

Furthermore, the two-dimensional arrangement of reforming blocks is possible in one layer, and an ideal distribution of reforming reaction rate can be achieved even in a compact reformer.

In a further preferred form of the invention, positions of said reforming blocks in two or more of said layers are shifted from each other in a flow direction of said reaction gas.

According to a structure such as this, the positions of the reforming blocks in each layer are shifted from each other in the reforming chamber comprising a multilayer structure. Accordingly, the dispersion of the reforming reaction can be easily and accurately achieved, and achievement of an ideal distribution of reforming reaction rate, i.e., temperature distribution becomes possible.

In a further preferred form of the invention, at least such portions of said separation plate means that are located backward of the reforming block in the flow direction of said reaction gas have permeability.

According to a structure such as this, in the reforming chamber comprising a multilayer structure, the flow and mixing of the reaction gases between gas flow passages are possible in the rear of the reforming block in the flow direction of the reaction gas. Therefore, even if the progress of the reforming reaction were insufficient at some of the reforming blocks, the progress of the reforming reaction would be possible by other reforming blocks at the backside. In addition, the setting of various kinds of reforming distributions becomes possible with a compact layer structure, and a compact and highly reliable reforming reactor can be obtained.

In a further preferred form of the invention, a single reforming catalyst layer is shared between a set of adjacent layers of said layers.

According to a structure such as this, a plurality of reforming catalyst layers can be collected into a single layer, and an ideal distribution reforming reaction rate can be achieved with a compact and inexpensive structure.

BRIEF DESCRIPTION OF THE DRAWINGS

The above and other objects and advantages will become apparent from the following detailed description when read in conjunction with the accompanying drawings wherein:

FIG. 1(a) is a side sectional view showing the structure of the reforming chamber of a reforming reactor of a first embodiment of the present invention;

FIG. 1(b) is a plan view showing the structure of the reforming chamber of a reforming reactor of FIG. 1(a);

FIG. 7 is a sectional view showing the structure of the reforming chamber of a reforming reactor of a second embodiment of the present invention;

FIG. 9(a) is a side sectional view showing the structure of the reforming chamber of a reforming reactor of a fourth embodiment of the present invention;

FIG. 9(b) is a plan view showing the structure of the reforming chamber of a reforming reactor of FIG. 9(a);

FIG. 10 is a sectional view of a conventional reforming reactor;

DESCRIPTION OF THE PREFERRED EMBODIMENTS

First Embodiment

Figure 2:
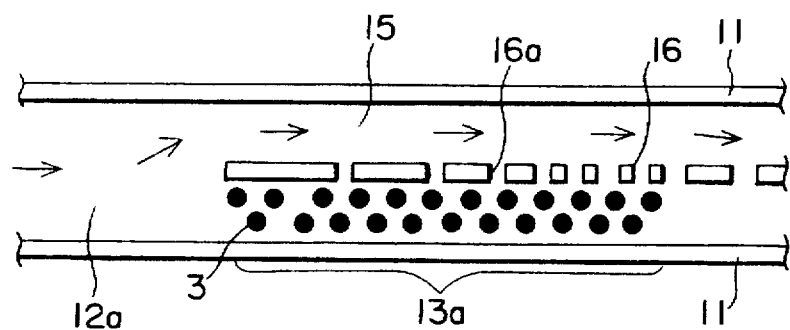
FIG. 2 is a sectional view showing an example of the structure of the reforming blocks provided in the reforming chamber of the reforming reactor of the first embodiment.

An embodiment of the present invention will hereinafter be described with reference to the accompanying drawings. FIG. 1(a) shows in cross-section a reforming chamber 2 of a reforming reactor constructed in accordance with the principles of the present invention, and FIG. 1(b) shows the flow of a reaction gas in reaction gas flow passages 12b and the position of arrangement of reforming blocks of the reforming chamber shown in FIG. 1(a).

In FIG. 1, an arrow 7 indicates a direction along which the reaction gas is supplied to and exhausted from the reforming chamber 2. In the reforming chamber 2 a plurality of reaction gas flow passages 12 are defined by a plurality of separation plates 11. Reforming blocks 13a to 13f each holding a reforming catalyst 3 in the interior thereof are provided in the reaction gas flow passages 12, as shown in FIG. 1(a). In the outlet portion of each of the reaction gas flow passages 12, there is a final reforming block 14, which holds the reforming catalyst 3 in the interior thereof.

The oblique lines in FIG. 1(b) indicate the positions where the reforming blocks 13a and 13b and the final reforming block 14 are arranged. Within the reforming chamber 2 of the reforming reactor in this embodiment, there are provided three reaction gas passages 12a, 12b, and 12c between which the reaction gas cannot come and go, as shown in FIG. 1(a). On the partial section of the reaction gas flow passage 12a, there are provided the reforming blocks 13a and 13b and the final reforming block 14. On the partial section of the reaction gas flow passage 12b, there are provided the reforming blocks 13c and 13d and the final reforming block 14. On the partial section of the reaction gas flow passage 12c, there are provided the reforming blocks 13e and 13f and the final reforming block 14.

Note that the arrows shown by solid lines in FIG. 1(b) indicate the directions of the reaction gas which flows through the reforming chamber.

Figure 3:
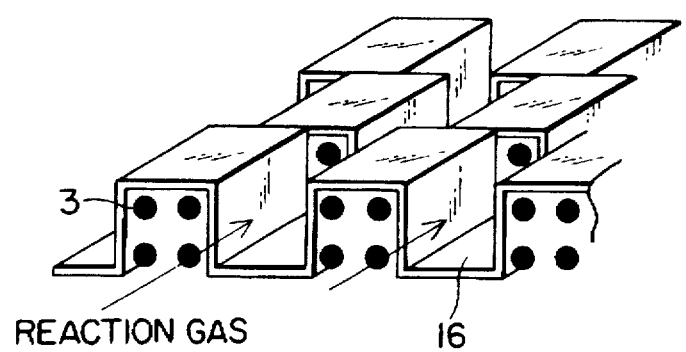
FIG. 3 is a perspective view showing another example of the structure of the reforming blocks provided in the reforming chamber of the reforming reactor of the first embodiment.

FIGS. 2 and 3 illustrate an example of the structure of the reforming block 13 for holding the reforming catalyst 3 on the partial section of the interior of the reaction gas flow passage 12. In the reforming block in FIG. 2, the reforming catalyst 3 is provided in a partial area so as to occupy a portion of the cross sectional area of the reaction gas flow passage 12. An area, which is not occupied by the reforming catalyst 3 and through which the reaction gas flows, forms a gas flow passage space 15. The reaction gas flow passage 12 is partitioned by a permeable partition plate 16 into the space for holding the reforming catalyst 3 and the gas flow passage space 15. In FIG. 3, the partition plate 16 is shown as being formed by a corrugated plate and having aperture portions. Although, in FIG. 3, reaction gas flow passages which are provided before and after the reforming block 13 are omitted, the reaction gas flow passage can be formed by the same corrugated plate as the partition plate 16, and the reforming catalyst is not filled into the reaction gas flow passage.

Next, the operation of the first embodiment of the present invention will be described with reference to FIG. 1. The reforming reactor shown in FIG. 1 is a plate-shaped reforming reactor and corresponds to the reforming chamber of the reforming reactor shown in FIG. 10 as prior art. In FIG. 1 there is omitted a heating chamber which is adjacent to the reforming chamber.

Initially, a description will be made of the progress of the reforming reaction.

The reaction gas mainly composed of a hydrocarbon or an alcohol is introduced into the reforming chamber 2, then is dispersed by a distributor 20, and thereafter is distributed into the reaction gas flow passages 12a, 12b, and 12c in accordance with a predetermined ratio. The reaction gas distributed to the reaction gas flow passage 12b flows through the reaction gas flow passage 12b without reacting for a while. Then, if the reaction gas reaches the reforming block 13a, only part of the reaction gas (in the embodiment of FIG. 1, about ½ of the reaction gas supplied to the reaction gas flow passage 12b) will be reformed by the function of the reforming catalyst 3 of the reforming block 13a until it nearly reaches its equilibrium state.

The reforming block 13a is dispersed and disposed in a direction perpendicular to the flow direction of the reaction gas, as shown in FIG. 1(b). Part of the reaction gas (in the embodiment of FIG. 1, about ½ of the reaction gas supplied to the reaction gas flow passage 12b), which flows through the reaction gas flow passage 12b, flows through the reaction gas flow passage 12b without contacting with the reforming catalyst of the reforming block 13a. For this reason, part of the reaction gas flows through the reaction gas flow passage 12b without reacting, and is reformed by the reforming catalyst 3 of the reforming block 13b separately provided on the downstream side of the passage 12b until it nearly reaches its equilibrium state. With this, because the reaction gas supplied to the reaction gas flow passage 12b flows through the reforming block 13a or 13b, it is reformed until it nearly reaches the equilibrium state. The reaction gas further passes through the final reforming block 14, which is provided at the outlet portion of the reforming chamber 2. The reaction gas is then reformed completely until the equilibrium state, and thereafter is exhausted from the outlet portion to the outside of the reforming chamber 2.

The reaction gas supplied to the reaction gas flow passage 12c, as in the reaction gas flow passage 12b, passes through the reforming blocks 13c and 13d provided so as to be shifted from each other in the flow direction of the reaction gas and is reformed until nearly reaching the equilibrium state. The reaction gas further passes through the final reforming block 14 and completion of reforming reaction is secured. The reaction gas supplied to the reaction gas flow passage 12a is likewise processed in a similar manner.

The reforming blocks 13a to 13f, as shown in FIGS. 2 and 3, hold within the reaction gas flow passage 12 the reforming catalyst 3 so that the catalyst 3 occupies part of the cross section area of the flow passage. The area of the cross section of the flow passage which is not occupied with the reforming catalyst 3 functions as the gas flow passage space 15. The space for holding the reforming catalyst 3 and the gas flow passage space 15 are partitioned by the partition plate 16 having aperture portions 16a. This partition plate 16 has permeability due to the existence of the aperture portions 16a, and the reaction gases in both the spaces can come and go between the spaces. In a reformer structure such as that shown in FIGS. 2 and 3, the reaction gas selectively flows through the gas flow passage space 15 where the resistance for gas-flow is low. The reaction gas flowing through the gas flow passage space 15 comes in contact through the aperture portions 16a of the partition plate 16 with the reforming catalyst 3 held in the reforming block 13, and is reformed.

For the hold-structure of the reforming catalyst 3 in the reforming blocks 13a to 13f, consider the two following cases. First, there is a case where the reforming catalyst 3 is held in the interior of the reaction gas flow passage 12 and serves as a reforming block. In this case, the structure of the reforming block may be the same as the structure of the reaction gas flow passage before and after the reforming block, except that the reforming block holds the reforming catalyst, and the reforming chamber can be constructed with a minimum number of parts. For example, the reforming block in the reaction gas flow passage before and after the reforming block can be constructed with the same corrugated plate, as shown in FIG. 3. In such a case, in the reaction gas flow passage the corrugated plate functions as a flow passage constituting material. In the reforming block, the corrugated plate functions as the flow passage constituting material and the partition plate 16. In addition, in this case an extra space for holding the reforming catalyst is not needed except for the reaction gas flow passage, so the reactor becomes compact. Furthermore, the contact between the reaction gas flowing through the reforming block and the reforming catalyst is satisfactorily held, and sufficient reforming reactivity is obtained.

As a second case, there is a case where the reforming catalyst 3 is held in one side portion adjacent to the reaction gas flow passage 12 and functions as a reforming block. The case will be described later in FIG. 8. In this case, even in the reforming block, the gas flow passage through which the reaction gas flows, is the same as the reaction gas flow passage before and after, and pressure drop can be minimized because the reforming catalyst is not held. In addition, there occurs less variation of the pressure drop among the reforming blocks resulting from the inaccuracy of filling of the reforming catalyst, and the distribution of gas to the reforming block can be performed with accuracy. Furthermore, the gas flow passage structure and the catalyst filling structure can be separately designed and manufactured, the degree of freedom of the design is large, and therefore an easy structure can be provided from the aspect of manufacturing.

For example, in the example of FIG. 8 described later, a plurality of hold spaces for reforming catalyst belonging to a plurality of reforming blocks can be collected into a single reforming catalyst layer and filled. As a result, the catalyst filling operation can be considerably simplified and an ideal distribution of reforming reaction can be readily achieved.

Furthermore, in the case where the reforming catalyst is held in the interior of the reaction gas flow passage and functions as a reforming block, the reforming catalyst may occupy the entire cross section of the gas flow passage in place of the structure of FIG. 2 where the reforming catalyst occupies only part of the cross section of the gas flow passage. More specifically, the reforming catalyst 3 is filled in the entire cross section of the flow passage by a general filling method, and for example, the filling structure and the reforming block, shown in the reforming chamber of a reforming reactor of FIG. 10, may be obtained. In a method such as this, the reaction gas flows through the small gaps as a reaction gas flow passage formed between the filled particles of reforming catalyst.

In the case where the reforming catalyst is held in such a gas flow passage, there are two cases, the case where part of the cross section of the gas flow passage is occupied and the case where the entire cross section of the gas flow passage is occupied. Both structures can be utilized from the standpoint of the achievement of avoiding the concentrated reforming reaction at the entrance and the stable operation, which are the main objectives of the present invention. If both structures are compared, the structure where part of the cross section is occupied with catalyst will have the following improved features over the structure where the entire cross section is occupied. First, the pressure drop in the flow passage becomes small. Second, problems, such as the variation of the pressure drop in the flow passage resulting from an inevitable variation of the filling density of the catalyst particles and the necessity of readjusting the pressure drop resulting from the above, come to disappear. Third, the design of the flow resistance of the gas flow passage is free from the filling quantity and the shape of the reforming catalyst. Therefore designing and adjustment of the flow resistance, necessary for determining the flow rate of the reaction gas to each reforming block, can be easily and quantitatively performed with a degree of freedom.

The partition plate constituting a reforming block such as this may be a plate-shaped porous plate such as that shown in FIG. 2, or a corrugated fin comprising a corrugated plate of the multi-entry type which is widely used in heat exchangers, such as that shown in FIG. 3. In the case of the corrugated plate of the multi-entry type, there is the advantage that the contact area between the reforming block 13 and the gas flow passage space 15 can be increased, the reforming block can be made thin, and the catalyst filling quantity can be made uniform by standardizing the filling quantity of the catalyst that is filled in the aperture of the corrugated plate.

Figure 4:
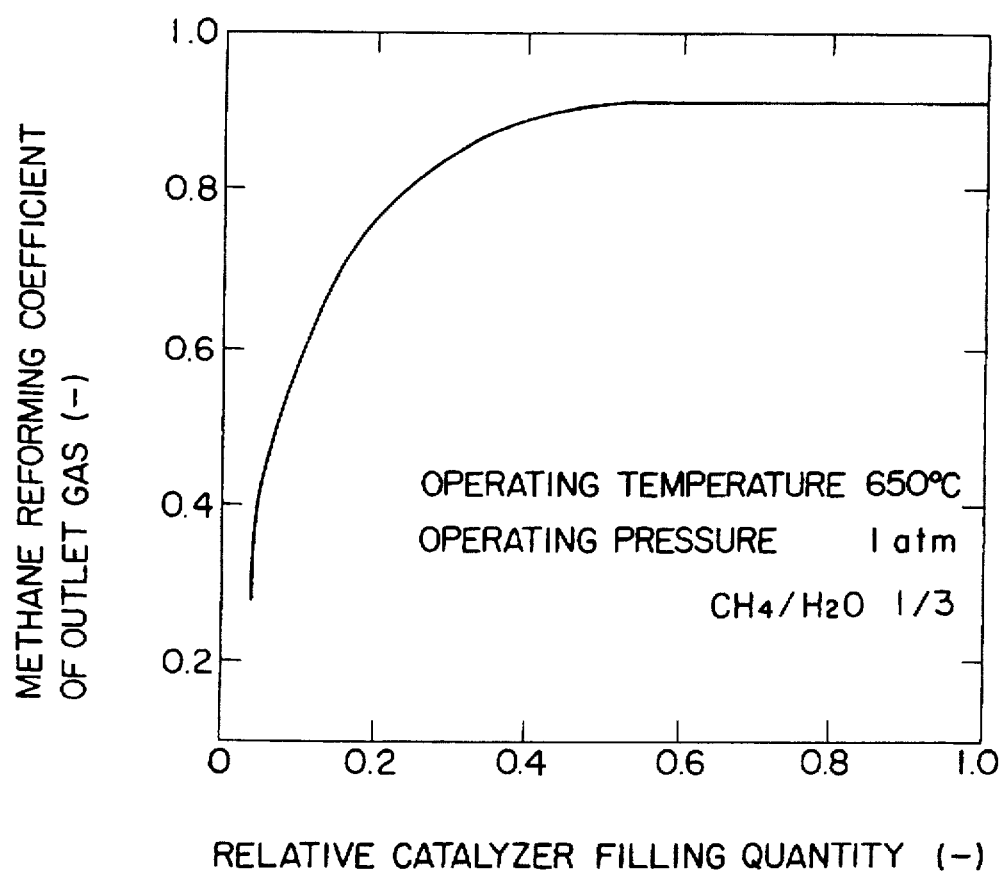
FIG. 4 is a diagram showing the relationship between a catalyst loading and a methane conversion, which is necessary in determining the catalyst loading of the reforming blocks in the reforming reactor of the first embodiment.

As for the reforming reactivity of the reforming block, the reforming catalyst 3 is held so that each of the reaction gases supplied to each reforming block is reformed to near the equilibrium state. The necessary quantity of the reforming catalyst or the length of the reforming block is computed by a conventional reaction engineering technique. For instance, FIG. 4 shows an example of the relationship between a relative catalyst loading and methane conversion at the outlet of reforming block. As shown, as the catalyst loading increases, the methane conversion comes to close to the equilibrium methane conversion (0.9 in this case). It is preferable in this embodiment that in the reforming block the reaction gas is to be reformed up to the vicinity of the equilibrium state. For example, in the operating conditions shown in FIG. 4, the filling quantity of catalyst is set so that the methane conversion at the outlet of the reforming block becomes 0.8 or more.

Figure 5:
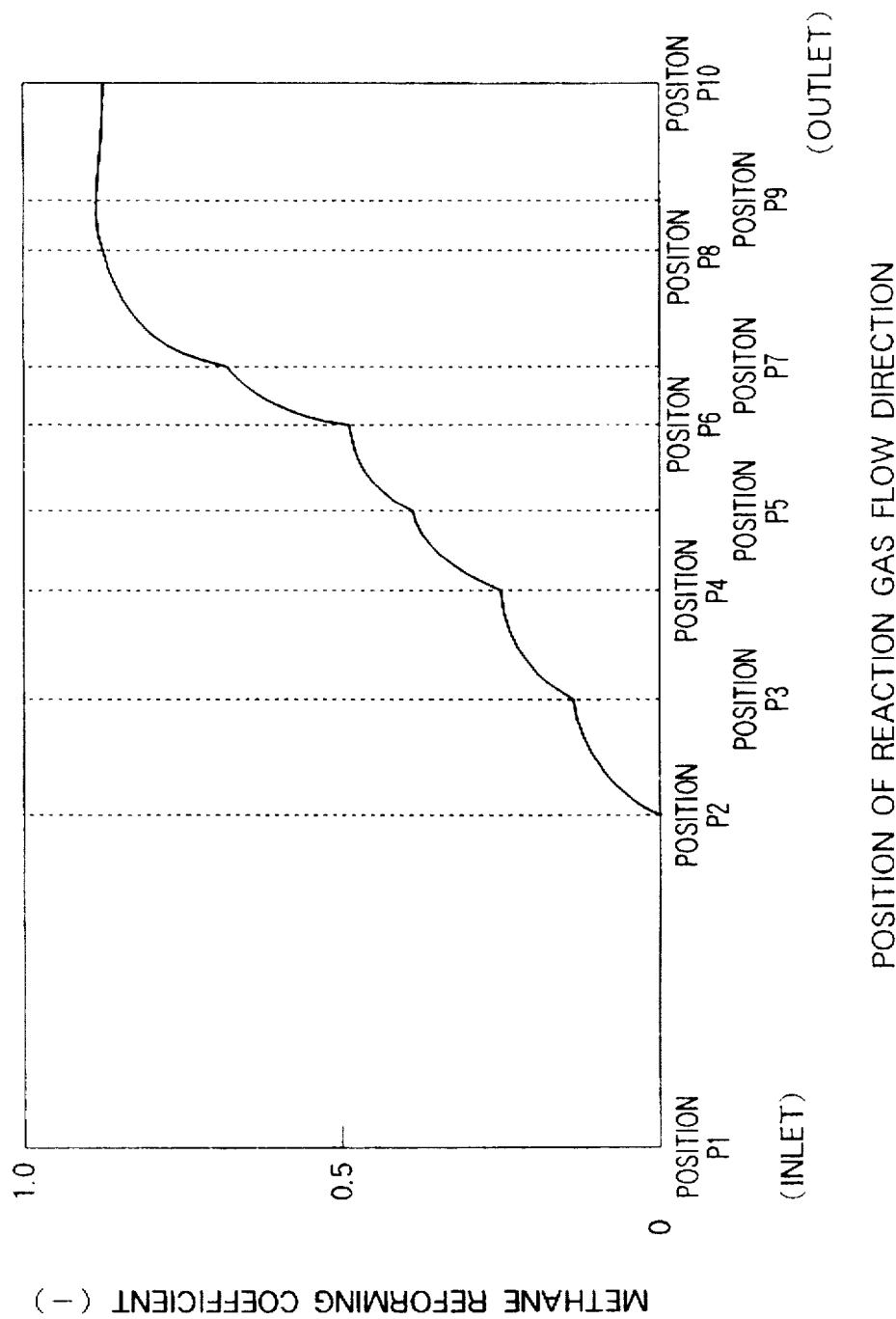
FIG. 5 is a diagram showing an example of a distribution of methane reforming rate distribution along the direction of the reaction gas in the reforming chamber of the reforming reactor of the first embodiment.

Now, an example of the distribution of methane conversion along the reaction gas flow direction in the aforementioned embodiment is shown in FIG. 5. As for the operating conditions, pressure is atmospheric pressure, temperature is 650 C., and a steam-methane ratio is 3.0. In FIG. 5, position P1 indicates the inlet of the reforming chamber 2, and position P10 indicates the outlet of the reforming chamber 2. Positions P2 to P8 indicate the start positions of the reforming blocks 13a to 13f and the final reforming block 14, respectively. Position P9 indicates the end position of the final reforming block 14. The reaction gas supplied to the reforming chamber 2 flows from the inlet portion of the reforming chamber 2 to the outlet portion, but the reforming reaction does not start in the vicinity of the inlet portion because the reforming catalyst is not held in the inlet portion. When viewed in the flow direction of the reaction gas, the reforming reaction will start if the reaction gas, which is distributed to the reaction gas flow passage 12b and passes through the reforming block 13a, reaches the position P2 The reaction gas, which is distributed to the reaction gas flow passage 12b and passes through the reforming block 13b, will start the reforming reaction if the reaction gas reaches the position P3 . Thereafter, the reaction gas distributed to the reaction gas flow passage 12c starts the reforming reaction at the positions P4 and P5 , and the reaction gas distributed to the reaction gas flow passage 12a starts the reforming reaction at the positions P6 and P7 . Methane distributed and supplied to the reforming blocks 13a to 13f is reformed at each reforming block to nearly the equilibrium state. Finally, the reaction gas passes through the final reforming block 14 and is secured to be reformed to the equilibrium state. The equilibrium methane conversion at the same conditions is about 0.9.

Thus, this embodiment has been designed so that a predetermined distribution of reforming reaction is obtained by providing a plurality of reforming reaction areas of the reforming blocks in the reforming chamber of the reforming reactor and fixing the amount of reforming reaction at each reforming reaction area. In this embodiment, in order to assure the degree of freedom of the layout of a plurality of reforming blocks, the reforming chamber is formed into a multilayer structure. In addition, as a method of fixing the quantity of the reforming reaction which proceeds at each reforming reaction area, a sufficient reforming catalyst is held in the reforming reaction areas and a predetermined quantity of reaction gas is independently supplied and is reformed at the reforming reaction areas to nearly the equilibrium state. With this, the reactor is designed so that distribution of reforming reaction can be accurately set and a stable distribution can be obtained for a long period of time. It is important in a design such as this to (1) hold reforming catalyst enough for reaction gas to reach a substantial equilibrium state, (2) accurately distribute and supply reaction gas to each reforming block, and (3) control reaction gas so as not to react at a place other than allocated reforming blocks.

Initially, for the first point, a necessary quantity can be easily determined by experimentation or computation, as previously shown in FIG. 4. If the catalyst loading is enough for a reforming reaction to go to a substantial equilibrium state, there would be little influence on methane conversion even if the filling quantity fluctuated to some degree. Also, even if reforming catalyst were filled to more than necessary, there would not be any particular problem. In the conventional technique, the conversion profile itself of the reforming reaction has a direct influence on a temperature distribution therefore not only the methane conversion at the exit of the reforming chamber must nearly reach its equilibrium, but also a predetermined distribution of methane conversion must be obtained in order to achieve a flat temperature distribution. Therefore, a highly sophisticated technology is required for determining a reaction profile. In the present invention, distribution of the reforming reaction is nearly determined by both the position of the reforming block and the distribution of reaction gas to each reforming block. The distribution of methane conversion in each reforming block is not so important in determining the distribution of reforming reaction in the entire reforming reactor and it does not become the limiting conditions of a design. Therefore, in each reforming block a rapid progress of reforming reaction is allowed at the inlet portion, and a long-life design by holding enough catalyst and a simple reactor design are possible.

For the second point, this problem is solved by introducing the reforming block 13 by the structure where the hold space for reforming catalyst and the gas flow passage space 15 are separated each other as previously shown in FIG. 2. In the conventional packed bed design because the reforming catalyst is uniformly filled in the entire flow space, the flow resistance mainly depends upon the shape and filling quantity of the catalyst and it is difficult to freely adjust only the flow resistance. In the embodiment shown in FIG. 2, the flow resistance of the reforming block depends only upon the structure of the gas flow passage space and is independent of the filling of the catalyst.Therefore the adjustment of flow resistance has no effect on the reforming reaction, and the flow resistance can be freely adjusted. More specifically, the adjustment of the flow resistance is possible by adjusting the height of the cross section of the reaction gas flow passage. This adjustment does not have any influence directly on the quantity of the reforming catalyst held in the catalyst hold space. In addition, for example, in the case where the reaction gas flow is formed with a corrugated plate, the adjustment of the flow passage resistance is also possible by adjusting the shape of the corrugated plate at each of the reaction gas flow passages. Furthermore, the thus set flow passage resistance is not influenced by the variation of the catalyst filing at the catalyst hold space, and an accurate design of the flow resistance is possible. Moreover, for the catalyst filling, check of variation of pressure drop and a filling readjustment operation such as those required for the conventional reforming reactor becomes unnecessary.

For the third point, the present invention has been designed such that the reaction gas flow passages for introducing reaction gas into the reforming blocks are provided independent of each other and that the reaction gas passing through one reaction gas flow passage does not come in contact with the reforming catalyst of another reforming block. The operating temperature of the reforming reactor is as high as 600 to 800 C., and the diffusion of gas is quick. In a case where an aperture portion which cannot be neglected exists in part of each reaction gas flow passage which introduces reaction gas, particularly in a case where the area of aperture portion is large and aperture portion is adjacent to the reforming catalyst of another reforming block, methane in reaction gas diffuses or passes through the aperture portion and advances its reforming reaction with the aid of the reforming catalyst of a neighboring reforming block. In such a case, the advance of the reforming reaction secondarily produced renders the design of the methane conversion profile inaccurate, or accurately predicting the progress of the reforming reaction secondarily produced is additionally required in setting the distribution of reforming reaction. That is, consideration for diffusion and gas flow becomes necessary at the time of design, in addition to consideration for reforming reaction rate. Consequently, a more complicated design becomes necessary.

On the other hand, for example, in the embodiment shown in FIG. 1, where the reaction gas passages 12a, 12b, and 12c are impermeable to one another, there is no such problem of reforming reaction secondarily produced. Therefore an easy and accurate design is possible. Also, for example, in the reaction gas flow passage 12b, there is a possibility of such a secondary reforming reaction to advance, in the reaction gas flow passage for introducing reaction gas to the reforming block 13b, shown in FIG. 1(a). In this case, there is no problem such as this if the reaction gas flow passages for introducing reaction gas to the reforming blocks 13a and 13b are partitioned and sealed at the boundary area by an impermeable material. In addition, for instance, if the reaction gas flow passage 12b is formed with a corrugated plate with no apertures where no gas exchange takes place between the gas channels of the upper side and lower side of the corrugated plate, then there will be no exchange of reaction gas in the lateral direction of the reaction gas flow, and no problem such as this will occur.

On the other hand, in the case where a corrugated plate with aperture portions shown in FIG. 3 is used as the partition plate 16, part of the reaction gas passing through the reforming block 13b proceed a secondary reforming reaction by the aid of the reforming catalyst positioned at the side-end of the reforming block 13a before reaching the reforming block 13b. More particularly, gas exchange partially takes place at the boundary between the reforming block 13a and the reaction gas flow passage 12b for introducing reaction gas to the reforming block 13b. Because of this gas exchange, a secondary reforming reaction advances. An estimated width of the reaction gas flow passage 12b for introducing reaction gas to the reforming block 13b is about 10 to 15 cm by way of example, while the pitch of the corrugation of corrugated plate is about 0.2 to 0.3 cm. In this case, about 10 percent of the reaction gas which passes through the reaction gas flow passage 12b leading to the reforming block 13b is practically equivalent to passing through the reaction gas flow passage 12b leading to the reforming block 13a from the viewpoint of contact between catalyst and reaction gas. If the quantity of the reforming reaction secondarily produced is such an amount as mentioned above or less, this problem can be sufficiently coped with by considering the quantity of the reforming reaction which is secondarily produced in determining the distribution of reaction gas to the reforming blocks 13a and 13b. Therefore it is can be said that the reaction gas flow passages is practically separated from each other as far as secondary reforming reaction is as low as the above.

Also, speaking from a point of view such as this, the reaction gas flow passages do not need to be designed so that they are separated from each other by an impermeable material, after the reforming reaction is nearly completed by the corresponding reforming block. Even if the reaction gas contacted with the reforming block of an adjacent reaction gas flow passage often the reforming reaction, the reaction gas would have no influence on the reforming reaction distribution because the reforming reaction has been nearly completed. In a structure such as this, even in a case where the advance of the reforming reaction is insufficient at one reforming block for some reason, the reaction gas has a chance to contact again with the reforming catalyst of another reforming block and therefore the achievement of a sufficient reforming reaction can be performed with reliability. Likewise, the reaction gases passing through the reaction gas flow passages may be mixed after main reforming reaction is completed, and then the mixed gas may be supplied to a single finishing reforming block.

Considering the temperature distribution of the reforming reactor, it is important, for example, in the plate-shaped reforming reactor shown in FIG. 1 that the distribution of endothermic heat in the reforming chamber and the distribution of generated heat in the heating chamber are balanced. The distribution of endothermic heat in the gas flow direction in the reforming chamber is determined by considering the distribution of reforming reaction and the heat of the reforming reaction.

Figure 6:
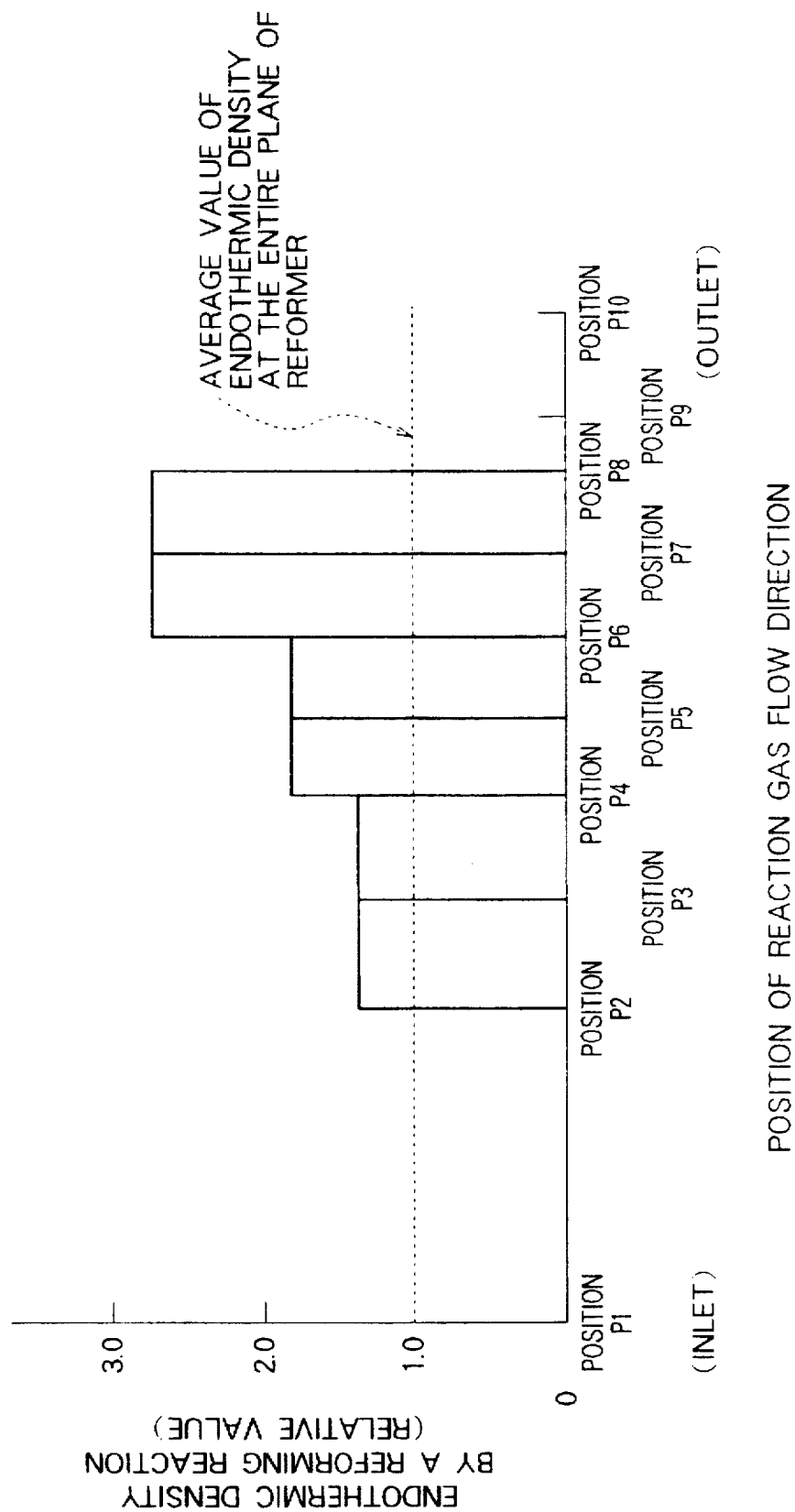
FIG. 6 is a diagram showing an example of an endothermic density distribution along the direction of the reaction gas in the reforming chamber of the reforming reactor of the first embodiment.

The relative-value histogram of the distribution of endothermic heat in the reaction gas flow direction of the embodiment shown in FIG. 1 is shown in FIG. 6. The average value of the endothermic heat density, obtained by dividing the total endothermic heat of the reforming reaction by the total laminated area, is shown by a broken line. As shown, in this embodiment, after distribution of generated heat density is postulated at the heating side, distribution of endothermic heat density in the reaction gas flow direction is obtained at the reforming side so that it is balanced with the distribution of generated heat density. Specifically, a design is made so that a predetermined endothermic density distribution, i.e., reforming reaction distribution is obtained by adjusting the structure of each reforming block and adjusting the distribution of the reforming blocks in the plane of lamination.

For example, the reforming blocks 13a and 13b are set longer in the reaction gas flow direction than the reforming blocks 13c and 13d, and the average density of endothermic heat in these areas is made small. Also, for example, the reforming blocks 13e and 13f are set far shorter in the reaction gas flow direction than the reforming blocks 13c and 13d, and the average density of endothermic heat is made large. This can also be achieved by another means, for example, by making the flow rate of the reaction gas flowing through the reaction gas passage 12a largest in accordance with the endothermic density distribution on the heating side and making the flow rate of the reaction gas flowing through the reaction gas passage 12b least. Specifically, this can be done by suitably adjusting the flow resistance or cross section area of the reaction gas or reforming block.

In addition, in the reaction gas flow passages 12a, 12b, and 12c, the regions filled with catalyst have been provided so as to be shifted in a zigzag manner in the flowing direction of the reaction gas at each flow passage. With this, the advance of the reforming reaction can be shifted in the reaction gas flow direction, so the endothermic heat density can be more finely controlled. This arrangement is nearly the same as the case where the reaction gas passage is divided into 6 layers and in each layer the reforming reaction areas are shifted. In the embodiment of FIG. 1, nearly similar advantages are obtained with only a three-layer structure, and consequently, the reforming reactor can be made compact and inexpensive.

In FIG. 6, the reason that the endothermic heat density is set to zero between the inlet area positions P1 and P2 of the reaction gas is that there was supposed a case where the heat supplied from a heating side is all used in the inlet area to preheat the reaction gas and that as a result reaction heat enough to advance the reforming reaction does not remain. In addition, the reason that the distribution of endothermic heat is increased in sequence from the position P2 to the position P8 is that in this embodiment there was assumed a case where the heat supplied from the heating chamber to the reforming chamber is increased in sequence from the position P2 to the position P8.

In either case, from the point of view that the temperature distribution of the reforming reactor is made uniform, the obtained distribution of endothermic heat is designed so as to match with a distribution of combustion heat obtained at the heat giving side, i.e., by the combustion in the heating chamber or by the transported heat from high-temperature gas fluid in the heat giving side. Or, in the case of a reactor where only the reforming chamber is incorporated and utilizes the excess heat generated at the other portion of a reactor; for example, in the case of a reforming reactor which is incorporated into a fuel cell apparatus and where the reforming reaction is advanced at the reforming chamber by making use of the aforementioned excess heat, the distribution of endothermic heat at the reforming chamber is designed so as to nearly match at an adjacent interface with the distribution of an excessively generated heat that is utilized. As a result, a more uniform temperature distribution is obtained in the reforming reactor, and the reforming reactor and the catalyst put in the reforming reactor can be stably operated for a long period of time.

It is preferable that the final reforming block 14 is provided at the highest-temperature portion of the reforming chamber 2. In the embodiment shown in FIG. 1 it is assumed that the outlet area of the reaction gas is the highest point of the temperature distribution. As an operating temperature becomes higher, the equilibrium conversion becomes higher. Therefore, the reaction gas, nearly reformed to the equilibrium state in the upstream reforming blocks 13a to 13f, passes through the final reforming block 14 and is further reformed. In addition, the part of the reaction gas which has not been completely reformed to the equilibrium state or the reaction gas which has skipped the catalyst layer for some reason passes through the final reforming block 14 again, and so the reforming reaction is reliably advanced.

The reforming reactor of the embodiment functions as follows with respect to the stability of the reforming ability. As for the progress of the reforming reaction at each reforming block, the reaction gas is designed to be reformed to the equilibrium state. Because of the reaction condition such as this, the progress of reforming reaction at the reforming block 13 is insensitive to a small change of the activity of the reforming catalyst 3. The amount of reforming reaction is mainly determined by the flow rate of the reaction gas that is supplied to the respective reforming blocks. Therefore, for the distribution of the entire reforming reaction at the reactor plane, the distribution is mainly determined by the flow passage structure of the reaction gas and the disposition of the reforming blocks on the plane, and is stable in principle because it does not involve a reaction step cause which varies with the passage of time.

In the respective reforming blocks, the distribution of the reforming reaction in the flow direction of the reaction gas changes with the passage of time, as in the conventional example. But, the degree of change is far smaller compared with the conventional example where the amount of catalyst is reduced and adjusted on purpose in order to suppress the advance of the reforming reaction. In addition, the change with the passage of time of the distribution of reforming reaction in the embodiment is mainly a change in a limited range like a change within the reforming block, and therefore the influence which the change has on the distribution of reforming reaction at the entire plane of the reactor is small. The entire distribution of reforming reaction has been roughly determined by the distribution of the reaction gas to each reforming block and the disposition of the reforming blocks.

In addition, in the embodiment the introduction portion of the reaction gas to the catalyst layer is scattered over the entire plane of the reactor. Therefore the influence which the poisoning of the catalyst has on the distribution of reforming reaction is also scattered over the entire laminated area, and there is eliminated the drawback that a bad influence is concentrated on the inlet portion of the reaction gas, found in the conventional reactor.

Second Embodiment

In the aforementioned first embodiment, three reaction gas flow passages 12a, 12b, and 12c are separated from each other and provided immediately after the inlet of the reforming chamber of the reforming reactor, and the reaction gas flow passages introduce reaction gases into the corresponding reforming blocks without mixing the reaction gases together. However, it is not always necessary that the reaction gas flow passages are completely separated over the entire length from the inlet of the reforming chamber to the outlet. In the reforming chamber 2, partially reformed reaction gases may be mixed together on the way and introduced into the reaction gas flow passages and reforming blocks provided downstream of the reforming chamber.

A second embodiment of the present invention, which has a mixing section in the process where reaction gas advances its reforming reaction, is shown in FIG. 7. FIG. 7 is a sectional view showing the structure of a reforming chamber constituted by two upper and lower reaction gas flow passages and reforming blocks. In this embodiment, the reaction gas is distributed at the inlet portion to reaction gas flow passages 12a and 12b. The reaction gas supplied to the reaction gas flow passage 12a is reformed by reforming blocks 13a and 13b. The reforming blocks 13a and 13b, as with the reforming blocks 13a and 13b of the embodiment previously shown in FIG. 1, are shifted from each other and disposed in the reaction gas flow passage 12a. The reaction gas distributed to the reaction gas flow passage 12b passes through the reaction gas flow passage 12b without reaction. The reaction gases exhausted from the reaction gas flow passages 12a and 12b are mixed at the mixing section 18 and then are distributed and supplied to reaction gas flow passages 12c and 12d provided downstream of the flow passages 12a and 12b. The reaction gas distributed to the reaction gas flow passage 12c is further reformed at a reforming block 13c, and the reaction gas distributed to the reaction gas flow passage 12d is further reformed at a reforming block 13d. Thereafter, the reformed reaction gases are exhausted from the reforming chamber.

While in the embodiment of FIG. 7 the reforming chamber has a two-layer laminated structure, the chamber may be divided into three reforming blocks (13a+13b), 13c, and 13d in the flow direction of the reaction gas. This embodiment can establish nearly the same distribution of reforming reaction as the embodiment of FIG. 1 comprising a three-layer laminated structure. The embodiment of FIG. 7 can obtain a reforming reactor which is thinner and more compact.

Thus, in the reforming reactor which has a reforming chamber of a multilayer structure that is constructed by stacking a plurality of layers, reaction gases are mixed on the downstream side of the reforming block provided on the most upstream side by means of the permeable portion of the interlayer separation plate, and further, the mixed gas is supplied to the reaction gas flow passage and the reforming blocks, which are provided downstream of the permeable portion. In this way, various kinds of reforming distributions can be achieved with a thinner layer structure.

Third Embodiment

Figure 8A:
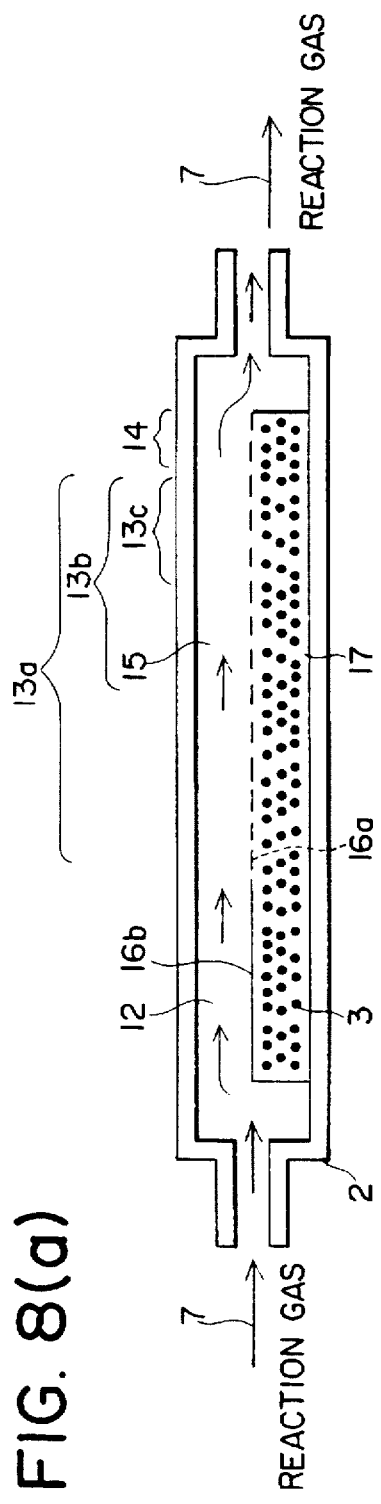
FIG. 8(a) is a side sectional view showing the structure of the reforming chamber of a reforming reactor of a third embodiment of the present invention.
Figure 8B:
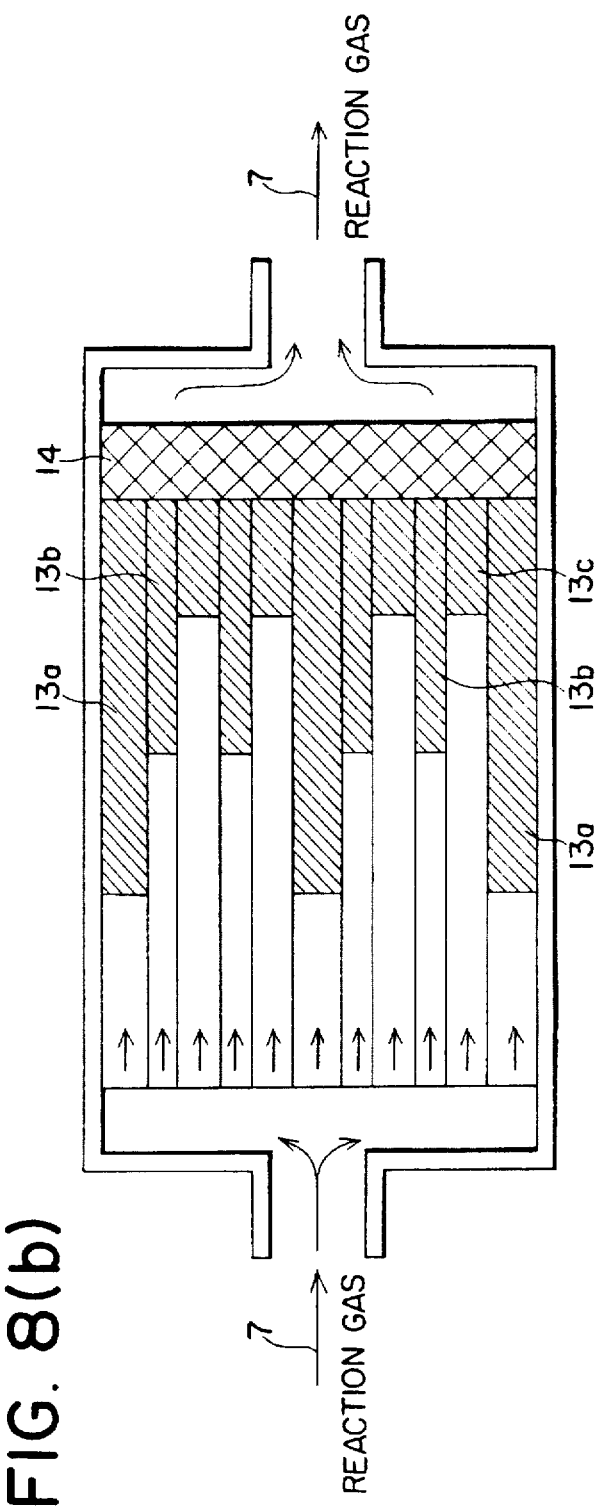
FIG. 8(b) is a plan view showing the structure of the reforming chamber of a reforming reactor of FIG. 8(a)
Figure 11:
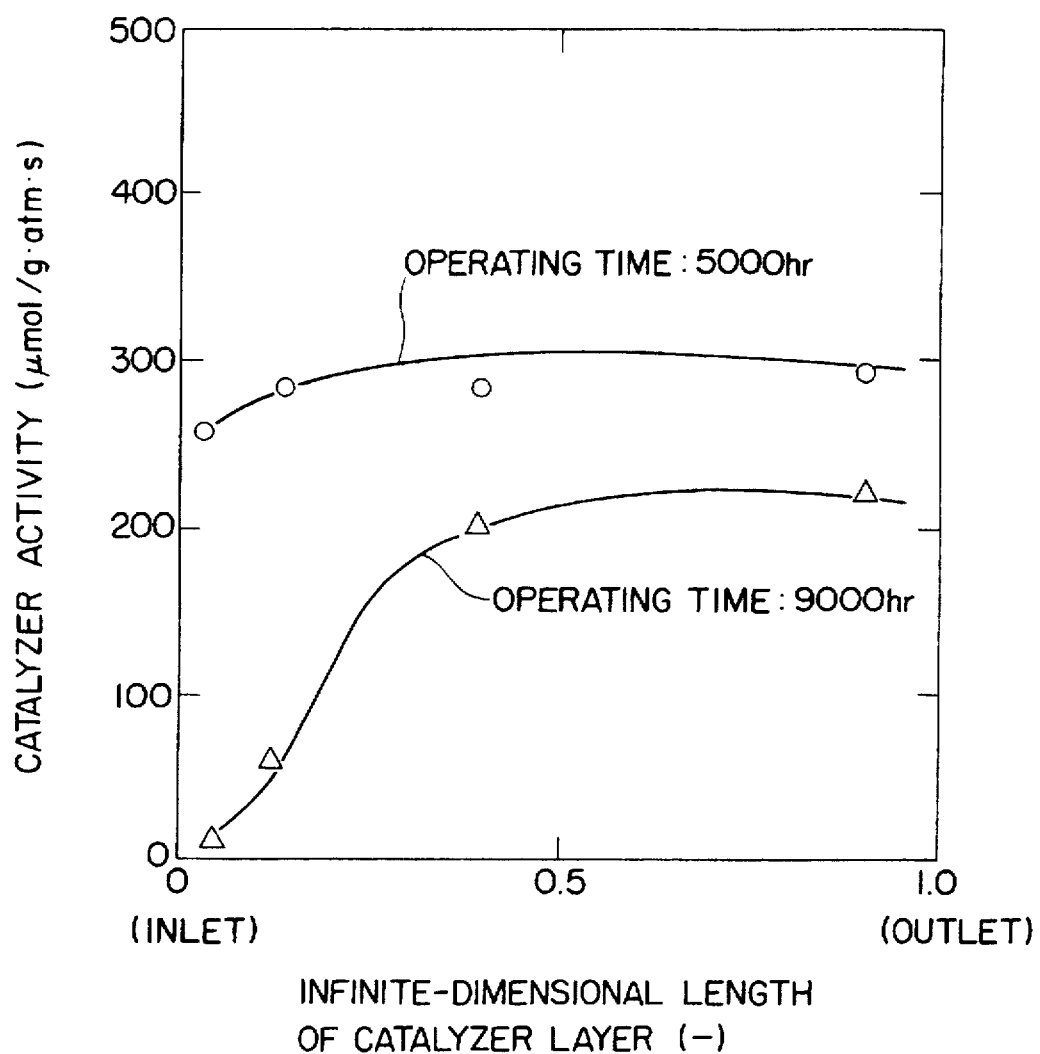
FIG. 11 is a diagram showing an example of the distribution of catalyst activity in the catalyst layer after a continuous operating test.
Figure 12:
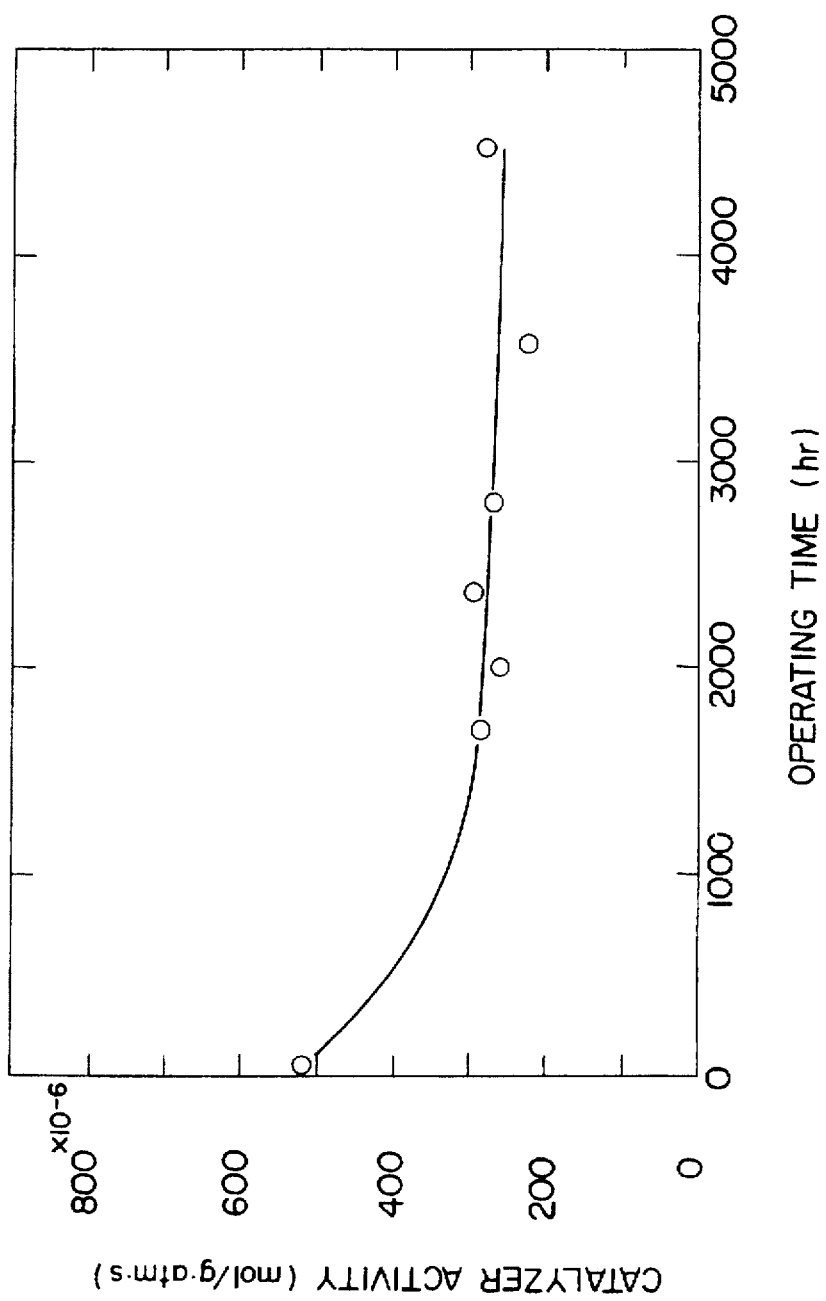
FIG. 12 is a diagram showing an example of the change with the passage of time of the activity of the reforming catalyst.

While in the first embodiment a plurality of reforming blocks each holding a reforming catalyst have been provided in the reaction gas flow passages in a scattered manner, a reforming catalyst may be held on one side of the reaction gas flow passage and constitute a reforming block, as shown in FIG. 8.

FIG. 8 illustrates a reforming chamber comprising a single layer, which is constituted by a gas flow passage layer including a plurality of gas flow passages 12 separated from one another, a reforming catalyst layer 17 holding a reforming catalyst 3 provided on one side of the gas flow passage layer, and a partition plate 16 interposed between the gas flow passage layer and the reforming catalyst layer 17 for partitioning both layers. In FIG. 8, reaction gas supplied is introduced into a plurality of the gas flow passages 12 separated from one another and is supplied to reforming blocks 13a, 13b, and 13c. In the reforming block 13, the reaction gas contacts with the reforming catalyst 3 through a permeable partition plate 16a and advances a reforming reaction. In this embodiment, along the flow direction of the reaction gas, first the reforming reaction is started at the reforming block 13a and then the reforming reaction advances in sequence at the reforming blocks 13b and 13c. Finally, the reforming reaction is secured to advance to the equilibrium state at a final reforming block 14. The reason that, in this embodiment, the areas of the reforming blocks 13a and 13b are extended up to the area of the final reforming block 14 is for assuring a complete advance of the reforming reaction in both the reforming blocks.

In addition, in the structure shown in this embodiment, the positions of a plurality of reforming blocks 13a, 13b, and 13c are not directly related to the filling position of the reforming catalyst 3, and correspond directly to the position of the permeable portion 16a of the partition plate 16. The impermeable portion 16b of the partition plate 16 corresponds to the reaction gas flow passage 12 where the reforming reaction does not advance. That is, for the filling of the reforming catalyst, the reforming catalyst can be uniformly filled in an area such as including at least an area of arrangement of a plurality of reforming blocks, and the reforming catalyst layer can be formed. If the partition plate is made porous only at an area where the reforming block is to be disposed, that portion can be regarded as a reforming block. If the partition plate has an impermeable portion 16b at a position facing the reaction gas flow passage 12 in order to prevent the advance of the reforming reaction, then whether the reforming catalyst exists in the catalyst layer 17 of this area or not will not become important. The catalyst filling area can be determined simply by the easiness of the filling operation of catalyst to the reforming catalyst layer and economic consideration on an filling of the unnecessary catalyst.

Thus, in this embodiment the reforming block holding a reforming catalyst is formed on one side of the reaction gas flow passage, and consequently, features are obtained as follows:

First, the cross section of the gas flow passage at reforming block is exactly the same (uniform) as the reaction gas flow passage before and after the reforming block, and the pressure drop through reforming block is minimized from the fact that the reforming catalyst is not held. In addition, no variation of the pressure drop resulting from the variation of filling of the reforming catalyst occurs, and the distribution of gas to the reforming block can be performed uniformly. Second, the gas flow passage structure and the catalyst filling structure can be separately designed and manufactured, the degree of freedom of the design is large, and therefore an easy structure can be obtained from the aspect of manufacturing. That is, in this embodiment, a plurality of hold spaces of reforming catalyst belonging to a plurality of reforming blocks can be collected into a single reforming catalyst layer 17, so a catalyst filling operation is considerably simplified. Because the disposition of the reforming blocks is prescribed by the setting of the permeable portion 16a of the partition plate 16, a complicated disposition of the reforming blocks, which is required in the aspect of the control of a reforming distribution, can be readily realized only by suitably setting the permeable portion of the partition plate. As a consequence, an ideal distribution of reforming reaction is obtainable with a compact reforming reactor.

Fourth Embodiment

As described above, in the reforming reactor where the gas flow passage including the reforming block is formed into a layer shape and the multilayer structure comprises this single lamination layer unit, the reforming block can be shared between a set of adjacent lamination layer units. The reforming reaction shown in FIG. 9 is a reactor of multilayer structure which comprises two reaction gas flow passages and a reforming catalyst layer 17 shared with both the reaction gas flow passages. A reforming block 13 is divided into small reforming blocks 13a, 13b, 13c, and 13d. Two adjacent reaction gas flow passages 12a and 12b are isolated from each other by the impermeable portion 16b of a partition plate 16. The partition plate 16 has permeable portions 16a so that the contact between the reforming catalyst 3 and the reaction gas in the gas flow passage is allowed at the positions of the reforming blocks 13a to 13d to advance a reforming reaction. That is, the partition plate 16 of this embodiment is impermeable at the area which separates the reaction gas flow passage from the space holding the catalyst, and is permeable at the area where the reforming blocks are set.

A sectional view where the disposition of the reforming blocks are viewed from the laminate layer side is shown in FIG. 9(b). In the figure, the reforming blocks and the final reforming block are indicated by oblique lines. The partition plate 16 in this embodiment is, for example, a porous plate which is bored by punching or etching only at the areas where the reforming blocks are positioned. As a structure of the reforming catalyst layer 17, there can be used a structure of a plate-shaped packed-bed type or a structure where a reforming catalyst is held on both surfaces of a corrugated plate such as that shown in FIG. 3 to form a plate-shaped hold space of catalyst. As a structure of the gas flow passages 12, a plurality of gas flow passages substantially divided from one another can be used. For instance, the upper and lower surfaces of a corrugated plate are interposed between the impermeable portions of the partition plate or between the housing plates of a reactor.

The embodiment, previously shown in FIG. 1, is constructed such that spaces for holding a reforming catalyst are independently provided in the reforming blocks. From the point of view that the temperatures of the reforming reactor are made uniform, it is preferable that the number of divisions of the reforming block are increased in the reforming chamber of the reforming reactor to obtain a smoother reforming distribution. On the other hand, if the number of the reforming blocks is increased, the manufacture of the reforming block will become complicated and the cost will become high. In the reforming reactor according to the embodiment shown in FIG. 9, the space for holding a reforming catalyst is a single space as a whole, and with respect to the setting of the reforming blocks, permeable portions provided in the partition plate, for example, aperture portions, can be provided so as to be aligned with the positions of the reforming blocks. For manufacture of a partition plate such as this, once a pattern for aperture portions is made, then the aperture portions can be easily mass-produced by punching or etching, and there is no problem about the complexity of disposition and manufacturing cost.

Thus, the embodiment shown in FIG. 9 has the advantage that the reforming reactor with the complicated disposition of reforming blocks can be cheaply and simply manufactured. In addition, the embodiment can provide a reforming reactor capable of favorable temperature control.

While the invention has been described with reference to specific embodiments thereof, it will be appreciated by those skilled in the art that numerous variations, modifications, and embodiments are possible, and accordingly, all such variations, modifications, and embodiments are to be regarded as being within the scope of the invention.

What is claimed is:

1. A reforming reactor comprising:
   a reforming chamber for reforming a reaction gas to a reformed gas by a reforming reaction;
   a plurality of gas flow passages disposed in adjacent layers in said reforming chamber for guiding said reaction gas from an inlet side toward an outlet side thereof, each of said gas flow passages having at least one reforming section, wherein a location of each reforming section in a flow direction of said reaction gas differs from a location of a reforming section in an adjacent gas flow passage such that adjacent reforming sections are staggered in said flow direction; and
   reforming block means provided in at least one reforming section within each of said gas flow passages and containing reforming catalyst with which said reaction gas, flowing through said gas flow passages, is brought into contact.

2. The reforming reactor as set forth in claim 1, further comprising means for inputting heat to said reforming chamber, wherein said reforming block means comprises a plurality of reforming blocks disposed such that a distribution of said reforming reaction of said reaction gas by said reforming catalyst contained in said reforming blocks corresponds with a distribution of heat which is input to said reforming chamber.

3. The reforming reactor as set forth in claim 1, wherein said reforming block means comprises a plurality of reforming blocks, and further including means for controlling said reforming reaction in each of said plurality of reforming blocks by adjusting a flow resistance in each of said gas flow passages.

4. The reforming reactor as set forth in claim 1, further comprising a final reforming block disposed in a reforming block section at a downstream side of said reforming block means for providing a final reforming of said reaction gas by said reforming catalyst.

5. The reforming reactor as set forth in claim 4, wherein said final reforming block is disposed in a highest operating temperature portion of the reforming block section which is located in an exit area of the reaction gas in the gas flow passages.

6. The reforming reactor as set forth in claim 4, wherein said final reforming block is constructed by retaining said reforming catalyst in said gas flow passage such that said reforming catalyst occupies part of the cross section of each said gas flow passages.

7. The reforming reactor as set forth in claim 1, wherein said reforming reactor comprises only a plate-shaped reforming chamber and is suitable for insertion into a molten carbonate type fuel cell stacked body.

8. The reforming reactor as set forth in claim 1, wherein said reforming block means comprises a plurality of reforming blocks, each of said reforming blocks comprises a partition plate which further divides each of said gas flow passages into a first sub-gas flow passage and a second sub-gas flow passage such that said first sub-gas flow passage holds said reforming catalyst and said reaction gas flows through said second sub-gas flow passage.

9. The reforming reactor as set forth in claim 8, wherein said partition plate has at least a permeable portion for allowing permeation of said reaction gas between adjacent ones of said gas flow passages.

10. The reforming reactor as set forth in claim 1, wherein each of said gas flow passages are constructed by a corrugated plate being sandwiched between a pair of impermeable plates.

11. The reforming reactor as set forth in claim 1, wherein said gas flow passages are laminated in layers by separation plate means.

12. The reforming reactor as set forth in claim 11, wherein each of said layers is partitioned into a reforming catalyst layer and a gas flow passage layer by a partition plate means having a permeable portion, which is interposed between said reforming catalyst layer and said gas flow passage layer.

13. The reforming reactor as set forth in claim 11, wherein a gas flow space in each of said layers is divided into a plurality of sub-gas flow passages.

14. The reforming reactor as set forth in claim 13, wherein positions of said reforming blocks in adjacent said sub-gas flow passages are staggered from each other in a flow direction of said reaction gas.

15. The reforming reactor as set forth in claim 11, wherein portions of said separation plate which are disposed behind a first reforming block from a gas inlet-side of said reforming reactor are permeable.

16. The reforming reactor as set forth in claim 11, wherein a single reforming catalyst layer is shared between a set of adjacent ones of said layers.

* * * * *